United States Patent
Handlon et al.

(10) Patent No.: US 9,774,279 B1
(45) Date of Patent: Sep. 26, 2017

(54) BRUSHLESS DC MOTOR CONTROL AND METHOD

(71) Applicant: BorgWarner Inc., Auburn Hills, MI (US)

(72) Inventors: Brian Edward Handlon, Arden, NC (US); Jeffrey Carter, West Yorkshire (GB)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/448,568

(22) Filed: Mar. 2, 2017

(51) Int. Cl.
*H02P 6/08* (2016.01)
*G05B 1/01* (2006.01)

(52) U.S. Cl.
CPC . *H02P 6/08* (2013.01); *G05B 1/01* (2013.01)

(58) Field of Classification Search
CPC .. F02N 11/00; H02P 29/00; H02P 6/00; H02P 6/08; H02K 29/08; H02K 7/10; G05B 1/01
USPC .......................................................... 318/561
See application file for complete search history.

(56) References Cited

U.S. PATENT DOCUMENTS

| | | | | |
|---|---|---|---|---|
| 3,483,457 A * | 12/1969 | Rodney, Jr | ................. | H02P 6/08 318/400.04 |
| 3,706,923 A * | 12/1972 | Dunfield | ................... | H02P 6/20 318/400.05 |
| 3,883,900 A * | 5/1975 | Jerard | ....................... | A61F 2/58 623/25 |
| 5,173,651 A * | 12/1992 | Buckley | ................. | H02K 29/08 310/106 |
| 5,361,025 A * | 11/1994 | De Filippis | ............... | H02P 6/18 318/599 |
| 5,744,950 A * | 4/1998 | Seefeldt | .................. | G01P 3/489 324/166 |
| 6,016,075 A * | 1/2000 | Hamo | .................... | H03F 3/2171 330/10 |
| 6,861,815 B2 * | 3/2005 | Cho | .......................... | H02P 7/03 318/599 |
| 7,057,361 B2 * | 6/2006 | Kitahata | ............... | H02M 5/458 318/139 |
| 7,064,510 B2 * | 6/2006 | Brannen | ................... | H02P 6/16 318/135 |
| 7,183,740 B2 * | 2/2007 | Nakayama | ............ | B60L 11/123 318/798 |
| 7,239,061 B2 * | 7/2007 | Huang | ..................... | H02K 3/28 310/166 |
| 7,891,330 B2 * | 2/2011 | Kishibata | .............. | F02D 41/062 123/179.14 |
| 8,004,220 B2 * | 8/2011 | Sparey | .................... | H02P 6/182 318/400.14 |

(Continued)

FOREIGN PATENT DOCUMENTS

WO      WO2014091152      6/2014

*Primary Examiner* — Rita Leykin (57) ABSTRACT

A system for controlling movement of an actuator includes an input power source that provides an input pulse width (PWM) signal; a motor driver that receives the PWM signal and provides a synthesized three-phase drive signal; a brushless direct current (BLDC) motor that receives the drive signal and operates in response to the received drive signal to reposition the actuator; and a controller that receives the PWM signal. The controller includes an amplitude detection module that detects the amplitude of the PWM signal, and a direction detection module that detects the polarity of the PWM signal.

20 Claims, 13 Drawing Sheets

(56) References Cited

U.S. PATENT DOCUMENTS

| | | | | |
|---|---|---|---|---|
| 8,310,102 B2* | 11/2012 | Raju | ................ | H02M 7/49 |
| | | | | 307/82 |
| 8,816,626 B2* | 8/2014 | Kurosawa | ................ | H02P 6/182 |
| | | | | 318/400.04 |
| 8,843,260 B2* | 9/2014 | Fukuzawa | ............. | B60W 20/00 |
| | | | | 180/65.21 |
| 8,991,338 B2* | 3/2015 | Teraya | ................... | B60K 6/445 |
| | | | | 123/41.02 |
| 9,043,119 B2* | 5/2015 | Horii | ...................... | F02D 29/02 |
| | | | | 701/102 |
| 9,071,186 B2* | 6/2015 | Wu | ........................ | H02P 27/08 |
| 9,190,940 B2* | 11/2015 | Markham | ................ | H02P 6/08 |
| 9,216,639 B2* | 12/2015 | Yamamoto | ............ | F02D 41/065 |
| 2009/0020092 A1* | 1/2009 | Kishibata | .............. | F02D 41/062 |
| | | | | 123/179.3 |
| 2011/0241583 A1* | 10/2011 | He | ..................... | H02P 21/0021 |
| | | | | 318/400.09 |
| 2015/0224845 A1 | 8/2015 | Anderson et al. | | |
| 2015/0323908 A1 | 11/2015 | Rondot et al. | | |
| 2016/0059664 A1 | 3/2016 | Tucker et al. | | |
| 2016/0075205 A1 | 3/2016 | Anderson et al. | | |
| 2017/0029014 A1* | 2/2017 | Yamamoto | ............. | B62D 5/04 |

\* cited by examiner

| VECTOR | A+ | B+ | C+ | A- | B- | C- | V_AB | V_BC | V_CA | |
|---|---|---|---|---|---|---|---|---|---|---|
| $V_0 = \{000\}$ | OFF | OFF | OFF | ON | ON | ON | 0 | 0 | 0 | ZERO VECTOR |
| $V_1 = \{100\}$ | ON | OFF | OFF | OFF | ON | ON | +V | 0 | -V | ACTIVE VECTOR |
| $V_2 = \{110\}$ | ON | ON | OFF | OFF | OFF | ON | 0 | +V | -V | ACTIVE VECTOR |
| $V_3 = \{010\}$ | OFF | ON | OFF | ON | OFF | ON | -V | +V | 0 | ACTIVE VECTOR |
| $V_4 = \{011\}$ | OFF | ON | ON | ON | OFF | OFF | -V | 0 | +V | ACTIVE VECTOR |
| $V_5 = \{001\}$ | OFF | OFF | ON | ON | ON | OFF | 0 | -V | +V | ACTIVE VECTOR |
| $V_6 = \{101\}$ | ON | OFF | ON | OFF | ON | OFF | +V | -V | 0 | ACTIVE VECTOR |
| $V_7 = \{111\}$ | ON | ON | ON | OFF | OFF | OFF | 0 | 0 | 0 | ZERO VECTOR |

- 210 — ELECTRICAL POWER IS APPLIED TO BLDC MOTOR AND ACTUATOR SYSTEM 10 TO ENERGIZE CONTROL COMPONENTS OF THE SYSTEM 10
- 220 — COMMAND SIGNAL IS PROVIDED TO ACTUATOR 40 TO COMMAND ACTUATOR TO MOVE TO A COMMANDED POSITION
- 230 — THE CONTROLLER DETERMINES A REQUIRED DIRECTION OF MOTION OF BLDC MOTOR 50 AND A REQUIRED STARTING TORQUE, RUNNING TORQUE AND TAIL TORQUE SUCH THAT THE ACTUATOR REACHES THE COMMANDED POSITION WITHOUT ANY OVERSHOOT AND DECELERATES TO REACH THE COMMANDED POSITION
- 240 — THE CONTOLLER 100 EXECUTES ROUTINES TO DIRECT APPLICATION OF THE REQUIRED TORQUE IN THE REQUIRED DIRECTION
- 250 — COMPONENTS OF THE SYSTEM 10 MONITOR AMPLITUDE AND DIRECTION OF THE APPLIED PWM SIGNAL 80 TO DRIVE THE BLDC MOTOR 50, AND TO ADJUST THE MAGNITUDE AND DIRECTION OF CONTROL TO MOVE THE ACTUATOR 40 TO THE COMMANDED POSITION
- 260 — THE ECU 20 DETERMINES THE ACTUATOR 40 REACHED THE COMMANDED POSITION VIA SIGNALING FROM THE OUTPUT SHAFT POSITION MONITOR AND APPLICATION OF A PWM SIGNAL 80 IS REMOVED FROM THE BLDC MOTOR 50

251 — THE CONTORLLER 100 SAMPLES THE PWM SIGNAL 80 AT A HIGH FREQUENCY AND USES A SOFTWARE FILTER TO RECOVER THE WAVEFORM OF THE PWN SIGNAL 80. THE CONTROLLER 100 DETERMINES REQUIRED TORQUE MAGNITUDE AND DIRECTION OF APPLICATION (E.G., CLOCKWISE OR COUNTER-CLOCKWISE) WITHOUT USING ANY SENSORS, SUCH AS HALL-EFFECT SENSORS

253 — SOFTWARE LOGIC IN THE CONTROLLER 100 EXECUTES TO DETECT THE AMPLITUDE OF THE RECOVERED WAVEFORM

255 — THE CONTROLLER 100 COMPARES THE RECOVERED WAVEFORMS FROM EACH SAMPLE TO DETERMINE WHICH IS LARGER. BY THIS COMPARISON PROCESS, THE CONTROLLER 100 DETERMINES THE AMPLITUDE OF THE PWM SIGNAL 80

257 — THE CONTROLLER 100 DETERMINES DIRECTION OF THE RECOVERED WAVEFORM

*FIG. 5B*

FIG. 5C ns of the system of FIG. 1.

BRUSHLESS DC MOTOR CONTROL AND METHOD

TECHNICAL FIELD

The present invention relates to brushless DC motors, and more particularly to controllers and control systems for brushless DC motors.

BACKGROUND OF THE INVENTION

Brushless direct current (BLDC) motors are known. As the name implies, BLDC motors do away with traditional brushes. With the elimination of brushes, these motors are more reliable than brush-type motors. In addition, BLDC motors can be made smaller and lighter than brush type motors yet have the same power output. However, the absence of brushes means that BLDC motors may require some form of electronic management to run.

SUMMARY OF THE INVENTION

A system for controlling movement of an actuator includes an input power source that provides an input pulse width (PWM) signal; a motor driver that receives the PWM signal and provides a synthesized three-phase drive signal; a brushless direct current (BLDC) motor that receives the drive signal and operates in response to the received drive signal to reposition the actuator; and a controller that receives the PWM signal. The controller includes an amplitude detection module that detects the amplitude and direction of the PWM signal.

A method for controlling an actuator driven by a brushless direct current (BLDC) motor includes applying electrical power to an actuator control system and an actuator movement system; determining, by a processor, a required direction of motion of the actuator movement system and a required torque, including a starting torque, a running torque, and a tail torque, that moves the actuator to a commanded signal; monitoring, by the processor, with no sensor input, applied torque of the driving signal applied to the actuator movement system; and modifying the torque of the driving signal to move the actuator to the commanded position.

A system for control of a BLDC motor and actuator includes an electronic control unit (ECU) that provides commands to move the actuator from a present position to a commanded position, wherein the commands are encoded in a PWM signal; a controller that, without any sensor input, decodes the commands encoded in the PWM signal and uses the decoded commands to control movement of the actuator; and a driver that receives the PWM signal and synthesizes a three-phase driving signal used in movement of the actuator.

BRIEF DESCRIPTION OF THE DRAWINGS

The detailed description refers to the following figures in which like numerals refer to like items, and in which.

DETAILED DESCRIPTION OF THE PREFERRED EMBODIMENTS

Brushless direct current (BLDC) motors are known, and may be particularly advantageous in conditions where reliability, compact size, and ruggedness are important. Compared to brushed DC motors, BLDC motors offer improved speed vs. torque characteristics, high dynamic response, high efficiency, noiseless and interference-free operation, extended speed ranges, compact size and low weight, and long operating life. Maintenance-free operation may be particularly valuable for systems that operate continuously.

Certain BLDC motors may be used to operate linear or rotational actuators. One specific application of BLDC motor-driven actuators is in automobiles and other motor vehicles. Such actuators are motor operated to achieve a commanded position—for example, to operate a waste gate or vanes in a turbocharger or a throttle valve. In these applications, the BLDC motor operates the actuator between a starting position and the final, or commanded, position, and may be required to be reversible—to enable the actuator to operate in two directions.

For the actuator to execute its function(s), its associated BLDC motor may be controlled to accelerate from a stopped position, decelerate as the commanded position of the actuator is approached, and stop at the commanded position of the actuator. In addition, the direction of rotation of the motor must be controlled to operate the actuator in the desired direction. To move the actuator, a certain torque value must be achieved by the motor, and the torque value may vary during actuator movement; for example, a high torque may be required to start the motor, with the torque generated in the desired direction of actuator movement. Toward the end of actuator movement, the torque may oppose the direction of motor rotation to slow actuator movement.

To achieve the necessary torque control, current amplitude in the motor's coils is controlled, as well as the phase of the current relative to the motor magnets (i.e., relative to the angle of the BLDC motor's rotor).

Figure 1:
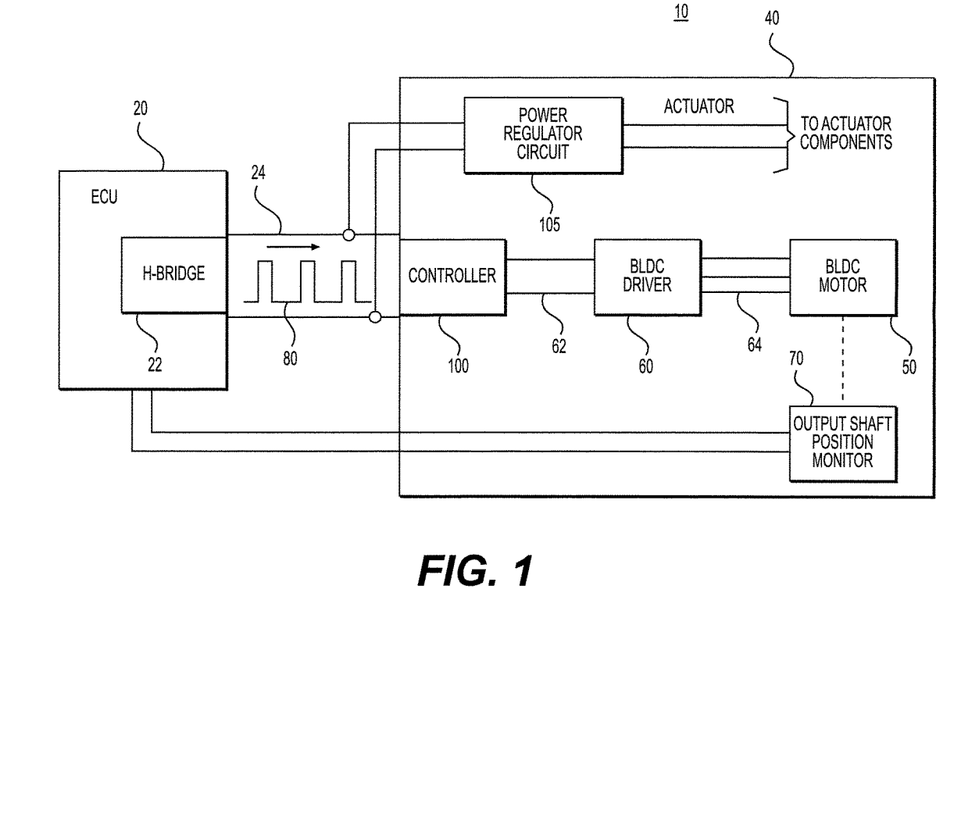
FIG. 1 is a simplified block diagram illustrating components of an example brushless DC (BLDC) motor and actuator system.

FIG. 1 is a simplified block diagram illustrating components of an example brushless DC motor and actuator system. In FIG. 1, system 10 includes electronic control unit (ECU) 20 and actuator 40. The ECU 20 includes H-bridge 22. The actuator 40 includes brushless DC motor (BLDC) 50, BLDC driver 60, output shaft position monitor 70, and microcontroller 100. The ECU 20 provides electrical power through H-bridge 22 to the actuator 40 through two-wire interface 24. The H-bridge 22 provides two-directional control of actuator 40. Operation of the H-bridge 22 creates a square-wave, pulse-width modulated (PWM) signal 80, which represents the desired amplitude and direction of a reference current. The H-bridge 22 is described in more detail with respect to FIG. 3A. The BLDC driver 60 synthesizes an input two-wire signal 62 from the controller 100 to create a three-phase signal 64 to apply to the BLDC motor 50. The output shaft position monitor 70 senses the position of an output shaft of the BLDC motor 50 and provides motor output shaft position information to the ECU 20, where ECU 20 logic (not shown) processes the information to modify the PWM signal 80. The microcontroller 100 decodes the PWM signal 80 to control operation of the BLDC 50 and, ultimately, actuator 40.

Figure 2:
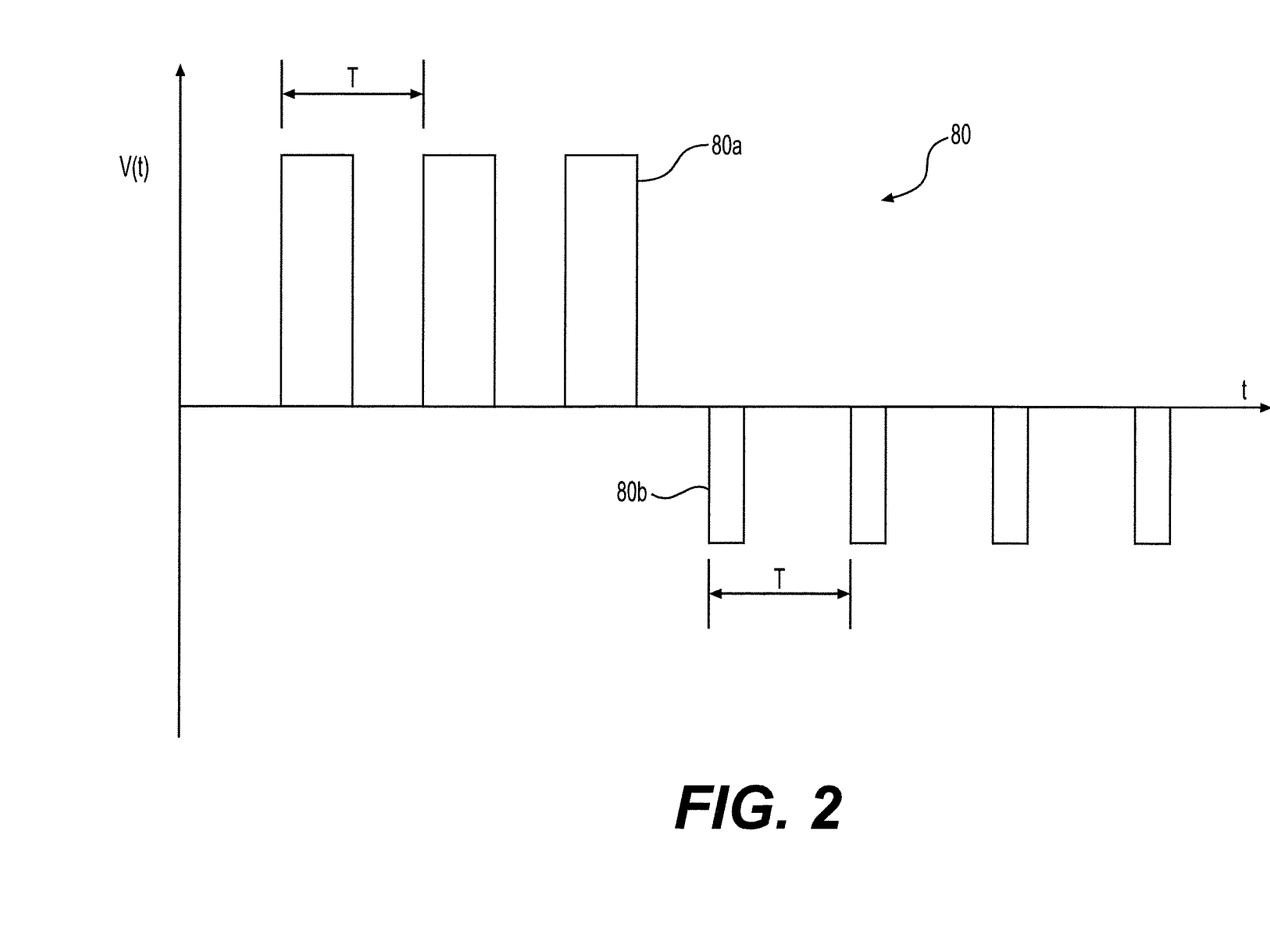
FIG. 2 illustrates a pulse-width modulation (PWM) waveform used in the system of FIG. 1.

The PWM signal 80 is shown in FIG. 2, which is an example signal that may be processed and used in the system 10 of FIG. 1. As disclosed herein, the PWM signal 80 is used for two purposes, namely to encode information that subsequently is decoded to control operation of the BLDC motor 50 and to provide power to operate the BLDC motor 50. Note that the illustrated PWM signal 80 does not include a sinusoidal fundamental. The PWM signal 80 includes positive pulses 80a and negative pulses 80b. The pulses 80a and 80b have a characteristic pulse width T, an amplitude as indicated on vertical scale V(t), and a direction, positive or negative. These characteristic values may be extracted or decoded from the PWM signal 80 and the decoded values may be used to control operation of the BLDC motor and actuator.

Returning to FIG. 1, the PWM connection 24 between the ECU 20 and the actuator 40 is a two-wire interface. The PWM signal 80 is encoded as the potential difference (voltage) between one wire and the other wire.

Figure 3A:
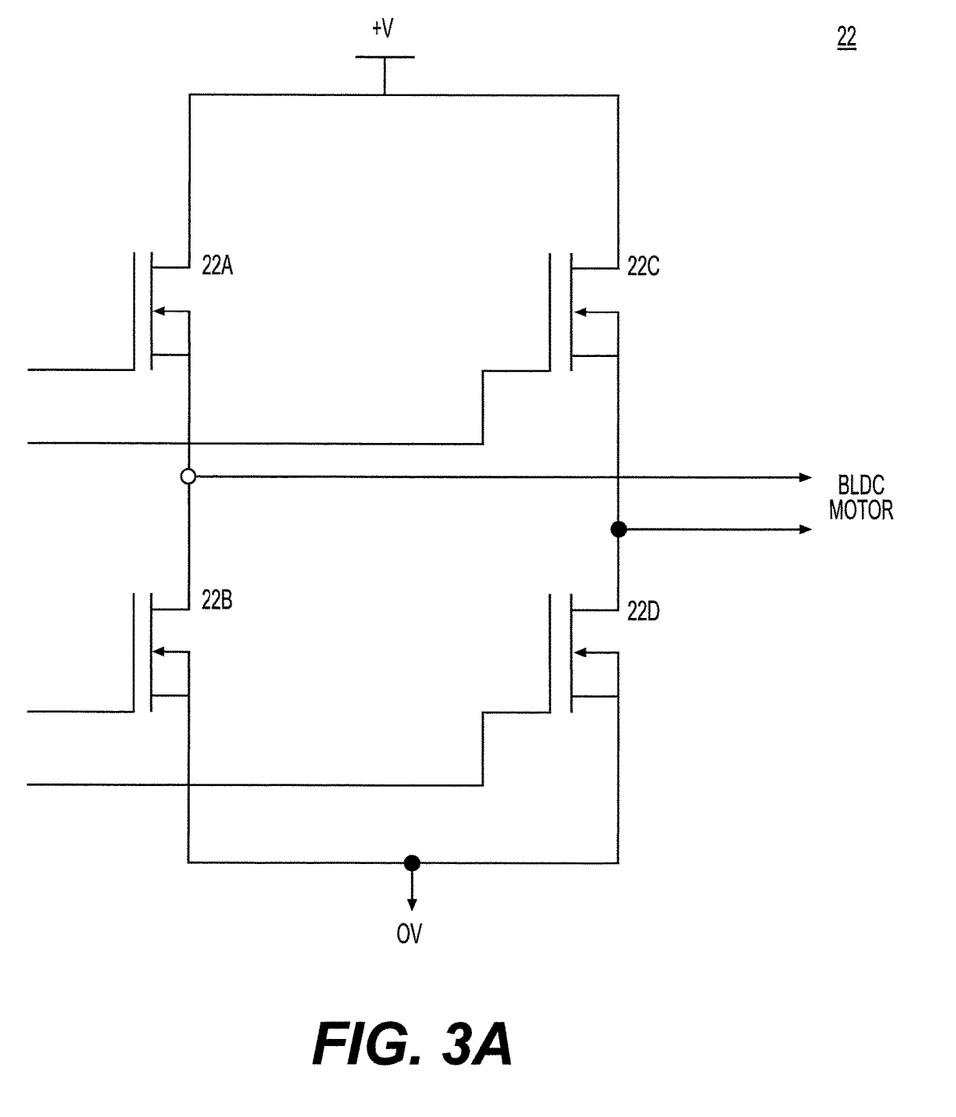
FIGS. 3A-3E illustrate example BLDC motor controller components used in the system of FIG. 1.

FIGS. 3A-3E illustrate example components of the system 10. The ECU 20 is equipped with H-bridge circuit 22, which makes it is possible to encode positive, negative and zero signals on the two-wire interface 24. FIG. 3A illustrates an example H-bridge that may be used in the ECU 20 of FIG. 1. In FIG. 3A, H-bridge 22 includes four transistors 22A-22D forming the H-bridge structure. The H-bridge 22 receives an input power signal and provides PWM signal 80 to the actuator 40.

In the system 10 of FIG. 1, the PWM signal 80 does not directly drive the BLDC motor 50. Instead, the PWM signal 80 is processed by additional circuitry, including the controller 100, which extracts information that provides the polarity (positive or negative) as an indication of the desired direction of motor torque, and the amplitude of the ac waveform as an indication of desired motor torque magnitude. The actuator 40, and more specifically the BLDC driver 60 synthesizes three-phase drive signal 64 to drive the BLDC motor 50. One example synthesis method is disclosed with respect to FIGS. 4A-4D. The actuator 40 also uses DC electric power by way of power regulator circuit 105 to operate actuator control electronics and as an input to synthesize the three-phase motor drive signal 64.

Figure 3B:
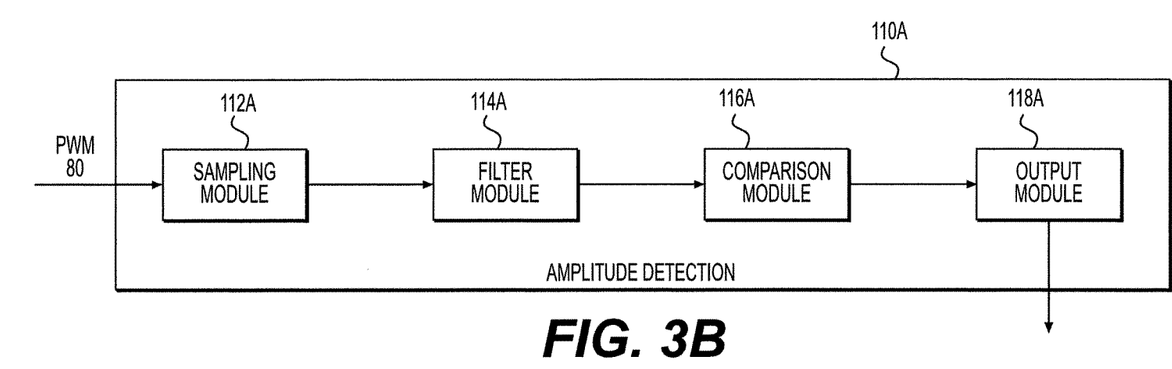
Figure 3C:
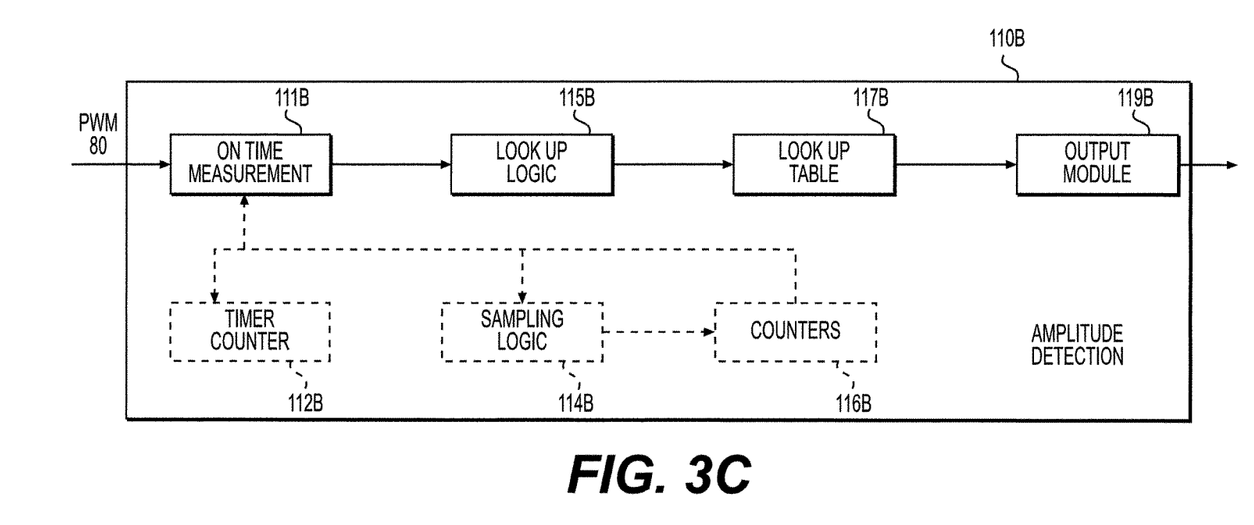
Figure 3D:
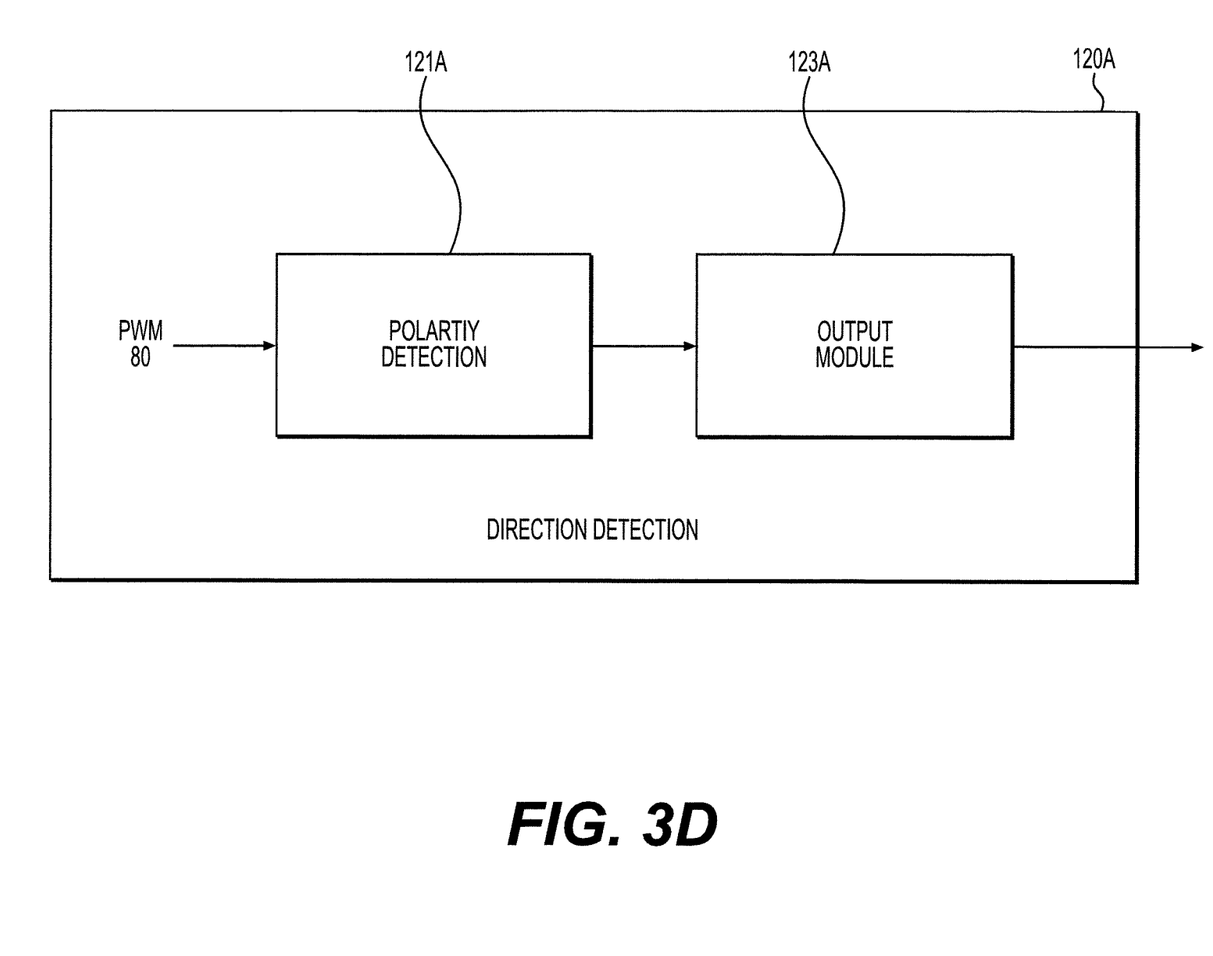

FIGS. 3B-3D illustrate example structures of the controller 100. The controller 100 functions to determine amplitude and direction information from the PWM signal 80. In an aspect, the controller 100 samples the PWM signal 80 at a high frequency and uses a software low-pass filter to recover an average or "fundamental" waveform of the PWM signal 80. Software logic in the controller 100 then is used to detect the amplitude and direction of the fundamental waveform each time the control loop is executed. FIG. 3B illustrates such an amplitude detection circuit 110A within the controller 100. In FIG. 3B, amplitude detection circuit 110A includes sampling module 112A, filter module 114A, comparison module 116A and output module 118A.

FIG. 3C illustrates alternative amplitude detection circuit 110B to determine amplitude based on measuring the on time of PWM signal 80 pulses. This is possible because as the on-time of the pulse train increases, the amplitude of the average or fundamental waveform increases. The relationship is not fully linear but it is free of inflections, i.e., there is a 1:1 relationship between input and output. In FIG. 3C, circuit 110B includes on-time measurement module 111B, look-up logic 115B, and look-up table 117B. The on-time measurement module 111B measures the on-time of the pulses of the PWM signal 80 and provides the measurement to the look-up logic 115B. The look-up logic 115B then compares the measurement to values in the look-up table 117B to determine amplitude. The on-time module 111B may measure on-time using edge-triggered timer-counter 112B or by using sampling logic 114B to sample at a regular frequency much greater than the PWM frequency and determining the voltage at each sampling instant and incrementing one of three counters 116B for the three voltage levels: positive, negative or zero.

FIG. 3D illustrates direction detection component 120A, which determines direction of the PWM signal 80. The component 120A receives sampled PWM signal 80. Polarity detection component 121A detects polarity of the sampled PWM signal 80 and provides a corresponding direction (positive or negative; up or down). For example, the component 121A samples voltage of the PWM signal and 80 determines change of sign (polarity) of the voltage. Output component 123A receives the signal direction information and provides a corresponding output that is used to control the BLDC motor 50.

Figure 3E:
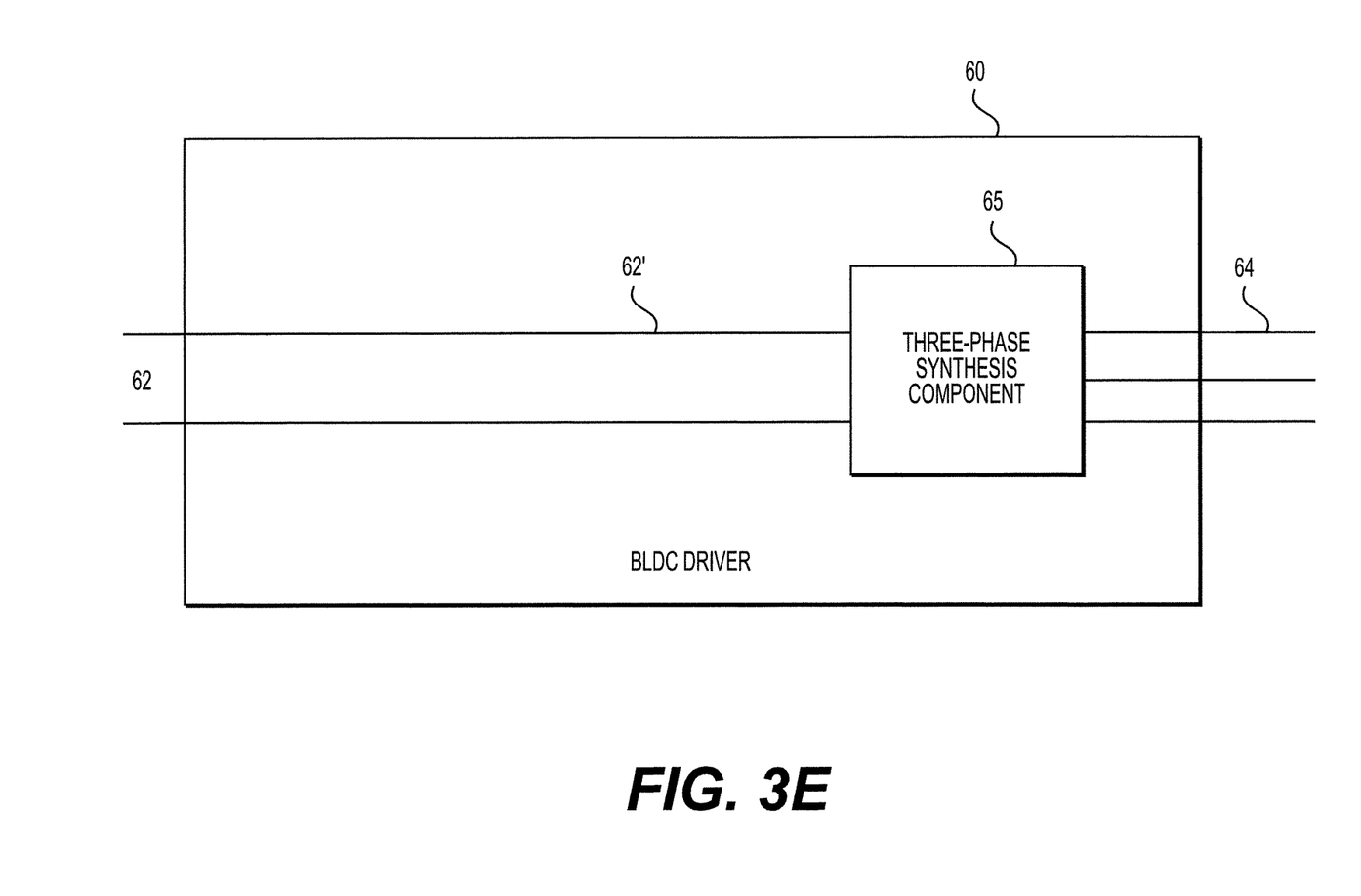

FIG. 3E illustrates example BLDC driver 60. In FIG. 3E, BLDC 60 is seen to contain three-phase synthesis component 65. Component 65 is shown in more detail in FIG. 4B. The component includes a four-diode bridge and capacitor structure that receives input power signal 62 and produces output 62'. Synthesis component 65 produces a three-phase power signal 64 to drive BLDC motor 50.

Once the motor current amplitude and direction reference information has been decoded as described above, the three-phase signals for the three-phase BLDC motor 50 can be synthesized. A modulation scheme is used to create the switching signals for a three-phase bridge. One example modulation device and corresponding method is illustrated by reference to FIGS. 4A-4D.

Figure 4A:
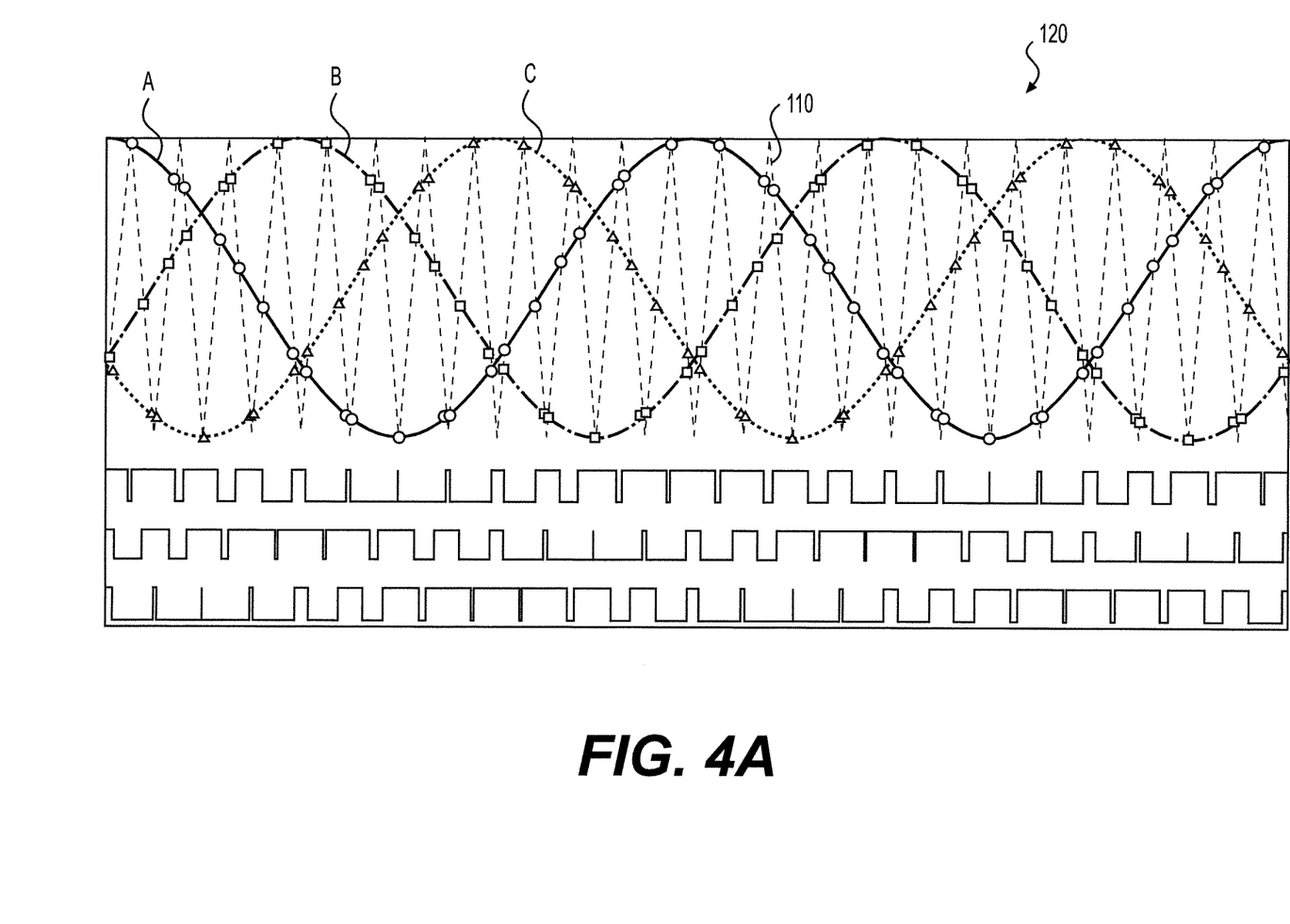
FIGS. 4A-4D illustrates waveforms and components of the system of FIG. 1 to control operation of an actuator.

FIG. 4A illustrates a waveform 120 used by components of the system of FIG. 1 to control operation of actuator 40 by synthesizing the three-phase signals. In FIG. 4A, intersections of a triangle carrier wave 110 and three sine modulating waves A, B, and C are used to determine switching instants for switches of the three phases. The three modulation waves A, B, and C are displaced 120 degrees from each other and their phase is synchronized to a reference phase determined by the controller 100 as described above. This "sine-triangle" modulation technique is known. Variations implementations on this technique are known, including saw-tooth carrier replacing the triangle carrier. There are also many implementations of this technique using various sampling techniques. Variations of this modulation technique are known which can modify the harmonic spectrum of the output waveform to achieve a specific design target.

Figure 4B:
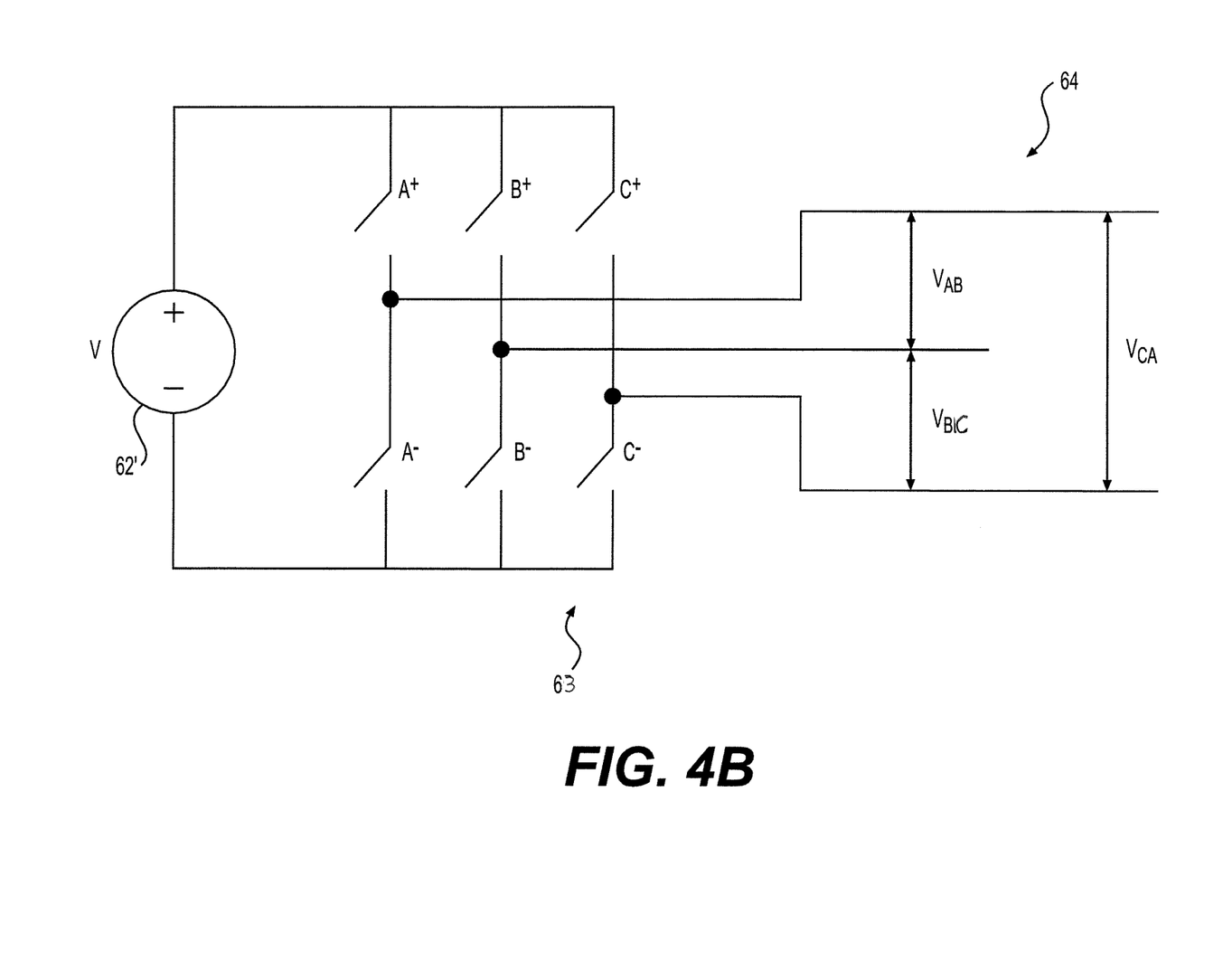
Figure 4C:
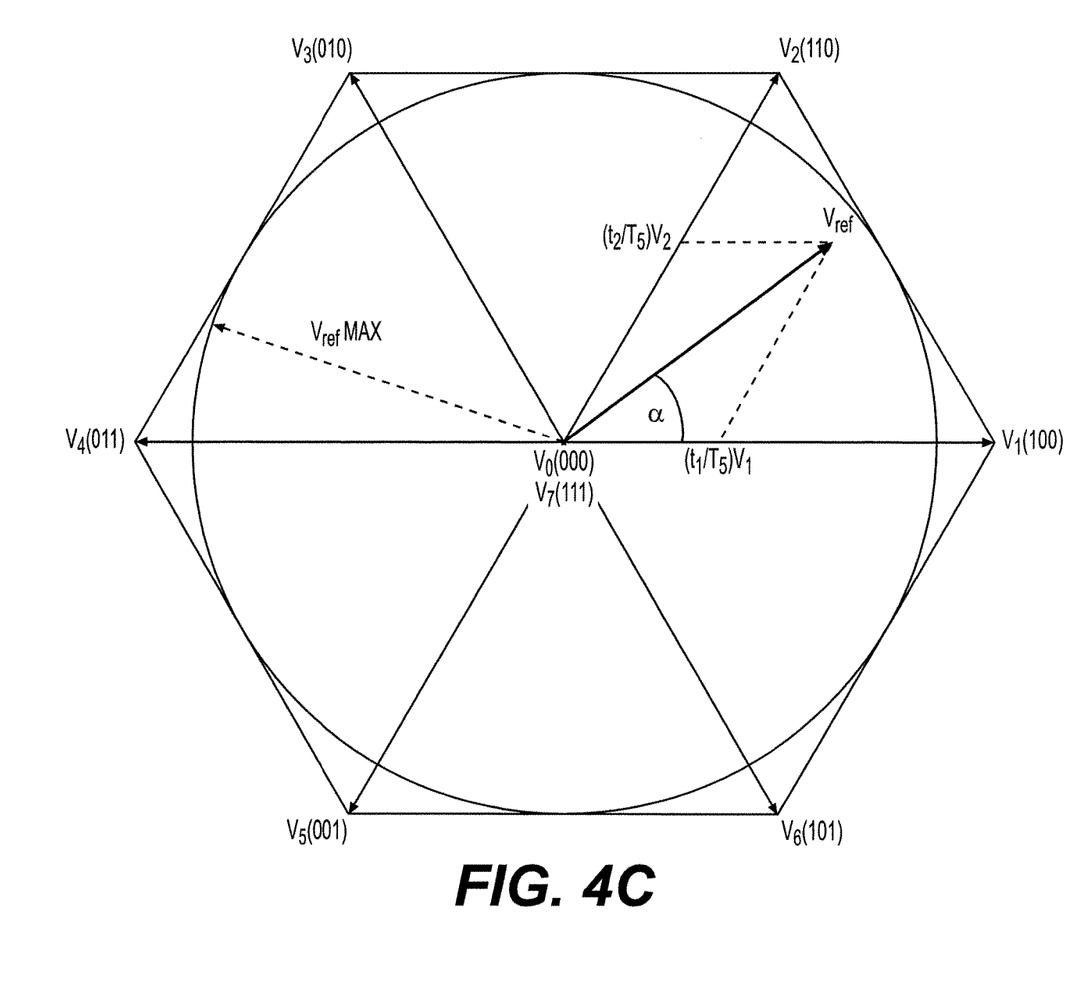
Figure 4D:
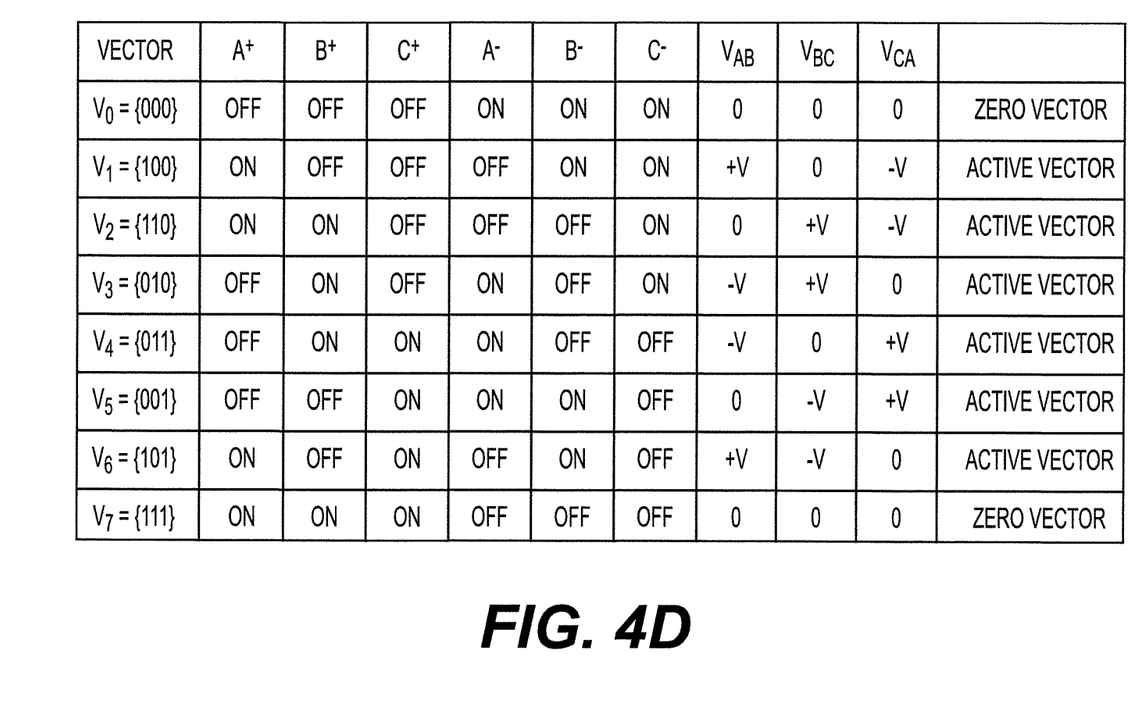

FIG. 4B illustrates example inverter 63 (in BLDC driver 60) that uses a series of switches $A^+$, $A^-$, $B^+$, $B^-$, $C^+$, and $C^-$ to produce three voltages $V_{AB}$, $V_{BC}$, and $V_{AC}$ to drive BLDC motor 50. The switches are controlled so that at no time are both switches in the same leg turned-on, which may be implemented by complementary operation of the switches within a leg; e.g., if $A^+$ is on, then $A^-$ is off, and vice versa. This leads to eight possible switching vectors for the inverter, $V_0$ through $V_7$ with six active switching vectors and two zero vectors as can be seen in FIG. 4C and FIG. 4D. The length of time that the switching configurations are active determines the resultant current vector and this is controlled so as to be synchronous with the rotation of the BLDC motor 50 and of defined amplitude and phase. This technique is known as space-vector modulation. Many implementations of space vector modulation are known but will not be described here because they do not form a key part of the invention. Trapezoidal modulation, also known as six-step or quasi-square wave modulation may also be used to drive the BLDC motor 50.

Figure 5A:
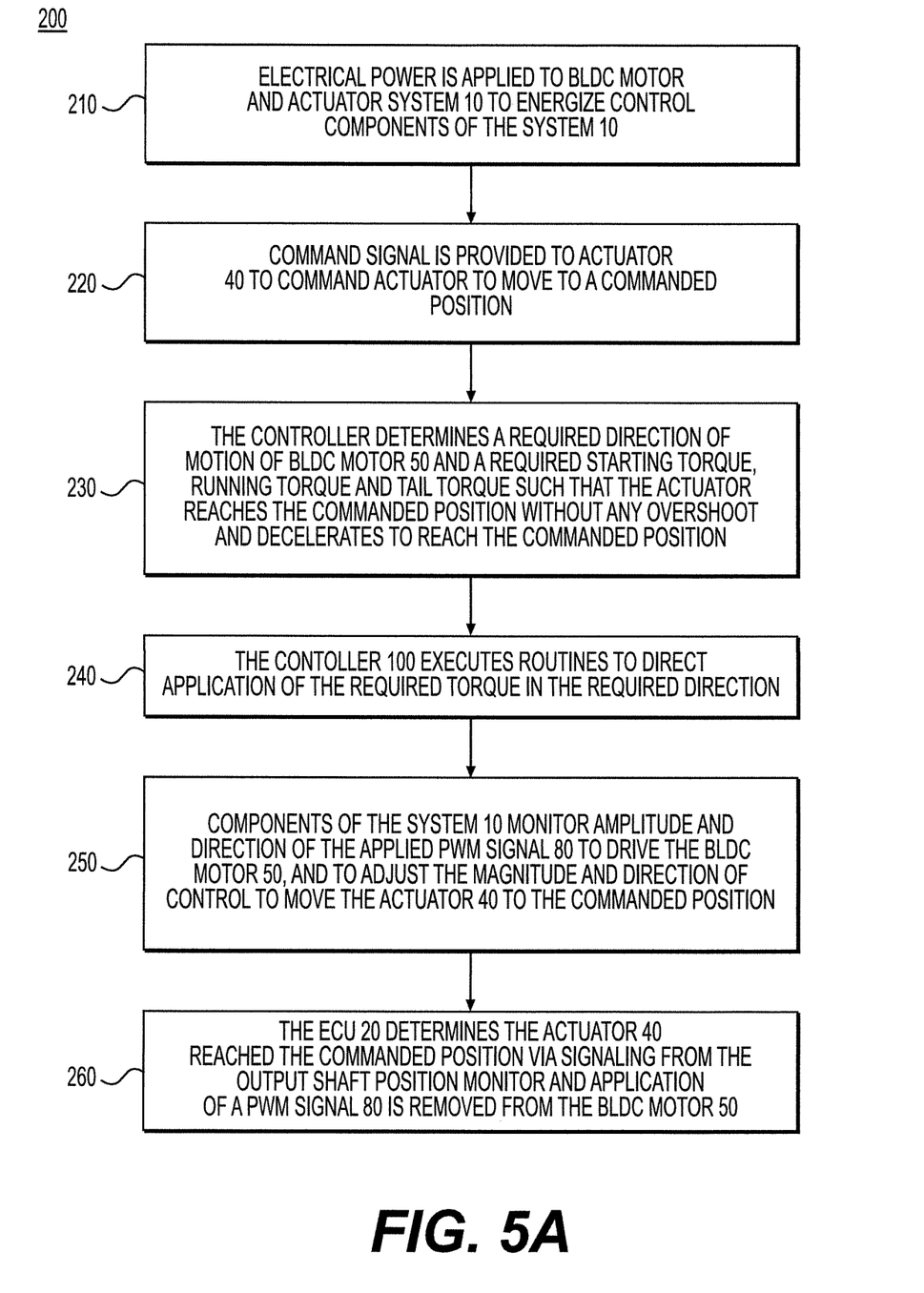
FIGS. 5A-5C illustrate operations executed by components of the system of FIG. 1.

FIG. 5A is a flowchart that illustrates BLDC motor method 200. In FIG. 5A, method 200 begins in block 210 when electrical power is applied to BLDC motor and actuator system 10 (see FIG. 1). The applied electrical power is used to energize control components of the system 10. In block 220, a command signal is provided to actuator 40 to command actuator to move to a commanded position. In block 230, the controller determines a required direction of motion of BLDC motor 50 and a required starting torque, running torque and tail torque such that the actuator reaches the commanded position without any overshoot and decelerates to reach the commanded position. In block 240, the controller 100 executes routines to direct application of the required torque in the required direction. In block 250, components of the system 10 monitor amplitude and direction of the applied PWM signal 80 to drive the BLDC motor 50, and to adjust the magnitude and direction of control to move the actuator 40 to the commanded position. In block 260, components of the system 10 determine the actuator 40 reached the commanded position, and application of a PWM signal 80 is removed from the BLDC motor 50.

Figure 5B:
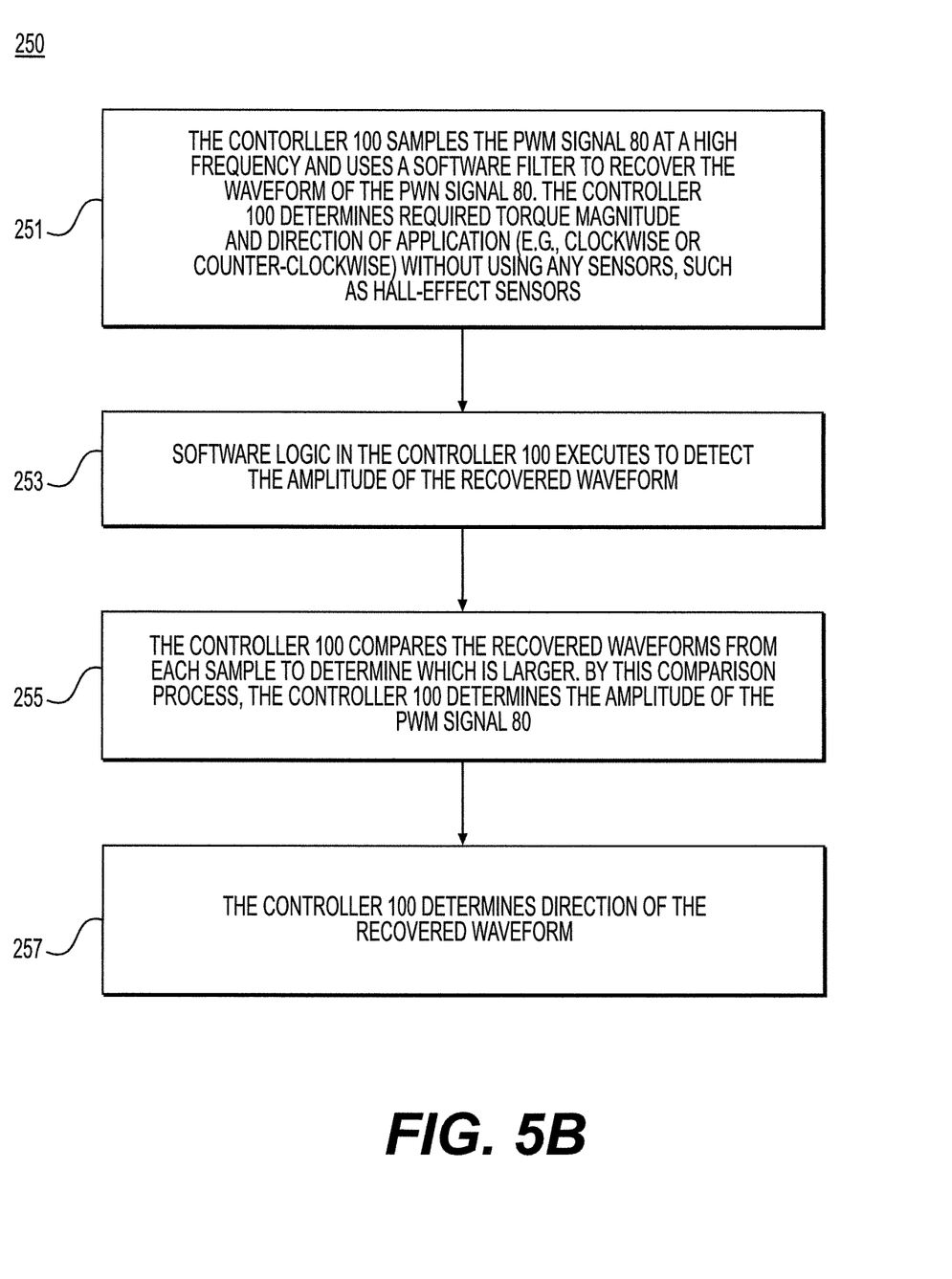

FIG. 5B illustrates methods of block 250 in more detail. In FIG. 5B, the controller 100 and other components of the system 10 function to determine amplitude and direction information from the PWM signal 80. In block 251, the controller 100 samples the PWM signal 80 at a high frequency and uses a software filter to recover the fundamental waveform of the PWM signal 80. That is, the controller 100 determines required torque magnitude and direction of application (e.g., clockwise or counter-clockwise). In block 253, software logic in the controller 100 executes to detect the amplitude of the fundamental waveform and in block 55, compares the sinusoidal waveforms from each sample to determine which is larger. By this comparison process, the controller 100 determines the amplitude of the PWM signal 80. In block 257, the controller 100 determines a direction of the covered waveform.

Figure 5C:
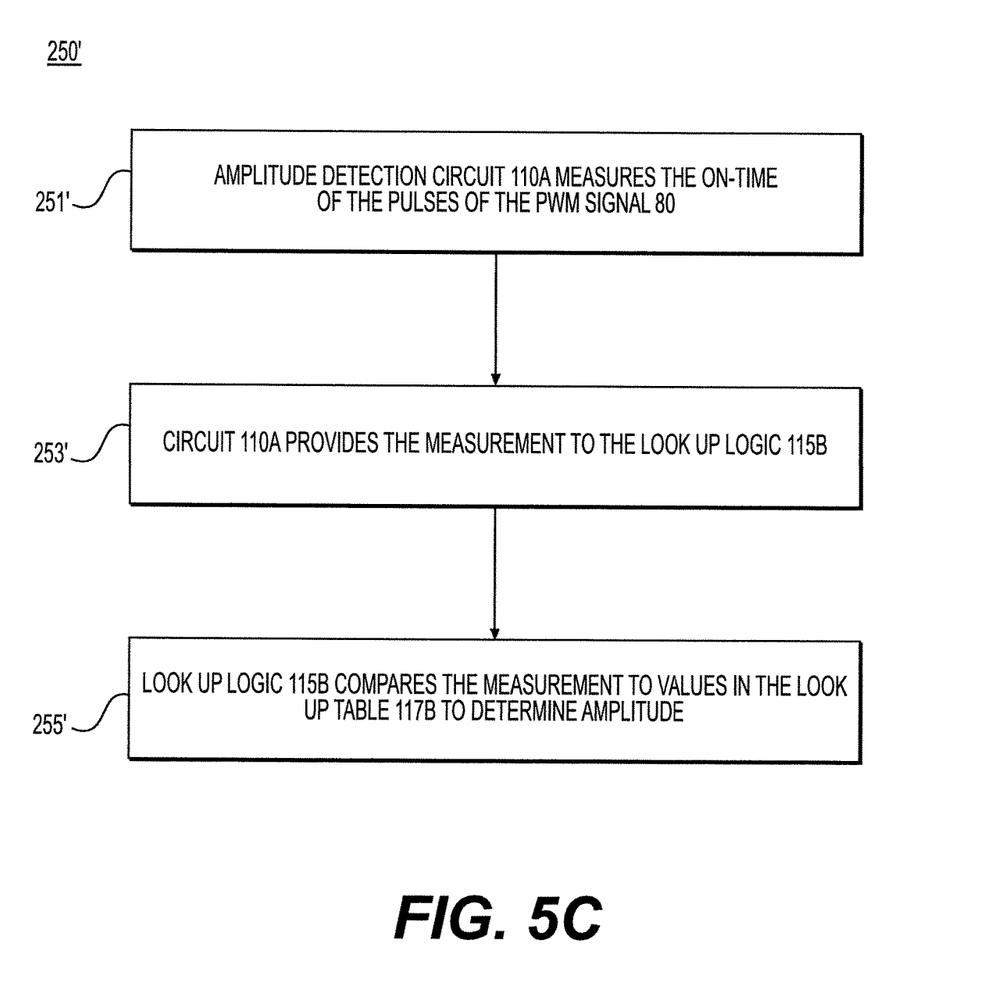

FIG. 5C illustrates an alternate amplitude detection process 250'. In FIG. 5C, block 251', amplitude detection circuit 110A measures the on-time of the pulses of the PWM signal 80 and in block 253' provides the measurement to the look-up logic 115B. In block 255', the look-up logic 115B then compares the measurement to values in the look-up table 117B to determine amplitude.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed systems may be implemented in, or may include an integrated circuit for the decoding. In the block diagrams above the integrated circuit is shown as a controller, but it could also be an alternative type of integrated circuit such an application-specific integrated circuit (ASIC) or field-programmable gate array (FPGA).

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A system for controlling movement of an actuator, comprising:
   an input power source that provides an input pulse width (PWM) signal;
   a motor driver that receives the PWM signal and provides a synthesized three-phase drive signal;
   a brushless direct current (BLDC) motor that receives the drive signal and operates in response to the received drive signal to reposition the actuator;
   a controller that receives the PWM signal, the controller, comprising:
      an amplitude detection module that detects the amplitude of the PWM signal, and
      a direction detection module that detects, without the sensor input, the polarity of the PWM signal; and
   a motor output shaft position monitor that provides output shaft position information to modify the PWM signal.

2. The system of claim 1, wherein the amplitude detection module comprises:
   a PWM signal sampling module that samples the PWM signal,
   a filter module that recovers an average waveform of the PWM signal; and
   a comparison module that detects the amplitude of the recovered waveform.

3. The system of claim 1, wherein the amplitude detection module comprises:
   an on time measurement module that measures the on time of each of a plurality of pulses of the PWM signal; and
   look-up logic that compares the on time measurements with data in a look-up table to determine the amplitude.

4. The system of claim 3, wherein the on time measurement module comprises an edge-triggered time counter that counts edges of a pulse.

5. The system of claim 1, wherein the direction detection module comprises a voltage sampling module that samples voltage of the PWM signal and determines change of sign of the voltage.

6. The system of claim 5, wherein the voltage sampling module measures a change from one of a positive and a zero voltage to a negative voltage.

7. A sensorless method for controlling an actuator driven by a brushless direct current (BLDC) motor, comprising:
   applying electrical power to an actuator control system and an actuator movement system;
   determining, by a processor, a required direction of motion of the actuator movement system and a required torque, including a starting torque, a running torque, and a tail torque, and a required phase of a driving signal that moves the actuator to a commanded signal;
   monitoring, by the processor, applied torque and phase of the driving signal applied to the actuator movement system; and
   modifying the torque and phase of the driving signal to move the actuator to the commanded position.

8. The method of claim 7, wherein monitoring the applied torque comprises:
sampling the driving signal,
recovering an average waveform of the driving signal; and
comparing the sample driving signal and the recovered waveform to detect an amplitude of the driving signal.

9. The method of claim 7, wherein monitoring the applied torque comprises
measuring an on time of each of a plurality of pulses of the driving signal; and
comparing the measured on time to information in a look up table to determine an amplitude of the driving signal.

10. The method of claim 7, wherein monitoring the direction of the driving signal comprises determining a change in voltage of the driving signal from one of a positive value and a zero value to a negative value.

11. The method of claim 7, further comprising:
synthesizing a three phase signal from the driving signal; and
applying the three phase signal to move the actuator to the commanded position.

12. The method of claim 7, wherein applying the three phase signal to move the actuator to the commanded position comprises applying the driving signal to a brushless direct current motor coupled to the actuator.

13. A system for control of a BLDC motor and actuator, comprising:
an electronic control unit (ECU) that provides commands to move the actuator from a present position to a commanded position, wherein the commands are encoded in a PWM signal;
a controller that, without any sensor input, decodes the commands encoded in the PWM signal and uses the decoded commands to control movement of the actuator
a driver that receives the PWM signal and synthesizes a three-phase driving signal used in movement of the actuator;
a BLDC motor output shaft position monitor that provides output shaft position information to the ECU; and
the ECU modifies the PWM signal using the shaft position information.

14. The system of claim 13, wherein the controller comprises:
an amplitude detection module that determines an amplitude of the PWM signal; and
a polarity detection module that determines a direction of the PWM signal.

15. The system of claim 14, wherein the amplitude detection module comprises:
a PWM signal sampling module that samples the PWM signal,
a filter module that recovers an average waveform of the PWM signal; and
a comparison module that detects the amplitude and compares the recovered waveform to the samples of the PWM signal.

16. The system of claim 14, wherein the amplitude detection module comprises:
an on time measurement module that measures the on time of each of a plurality of pulses of the PWM signal; and
look up logic that compares the on time measurements with data in a look up table to determine the amplitude.

17. The system of claim 16, wherein the on time measurement module comprises an edge-triggered time counter that counts edges of a pulse.

18. The system of claim 14, wherein the polarity detection module comprises a voltage sampling module that samples voltage of the PWM signal and determines change of sign of the voltage.

19. The system of claim 18, wherein the voltage sampling module measures a change from one of a positive and a zero voltage to a negative voltage.

20. The system of claim 14, wherein the three-phase driving signal is applied to a brushless direct current motor.

* * * * *